Figure 1:
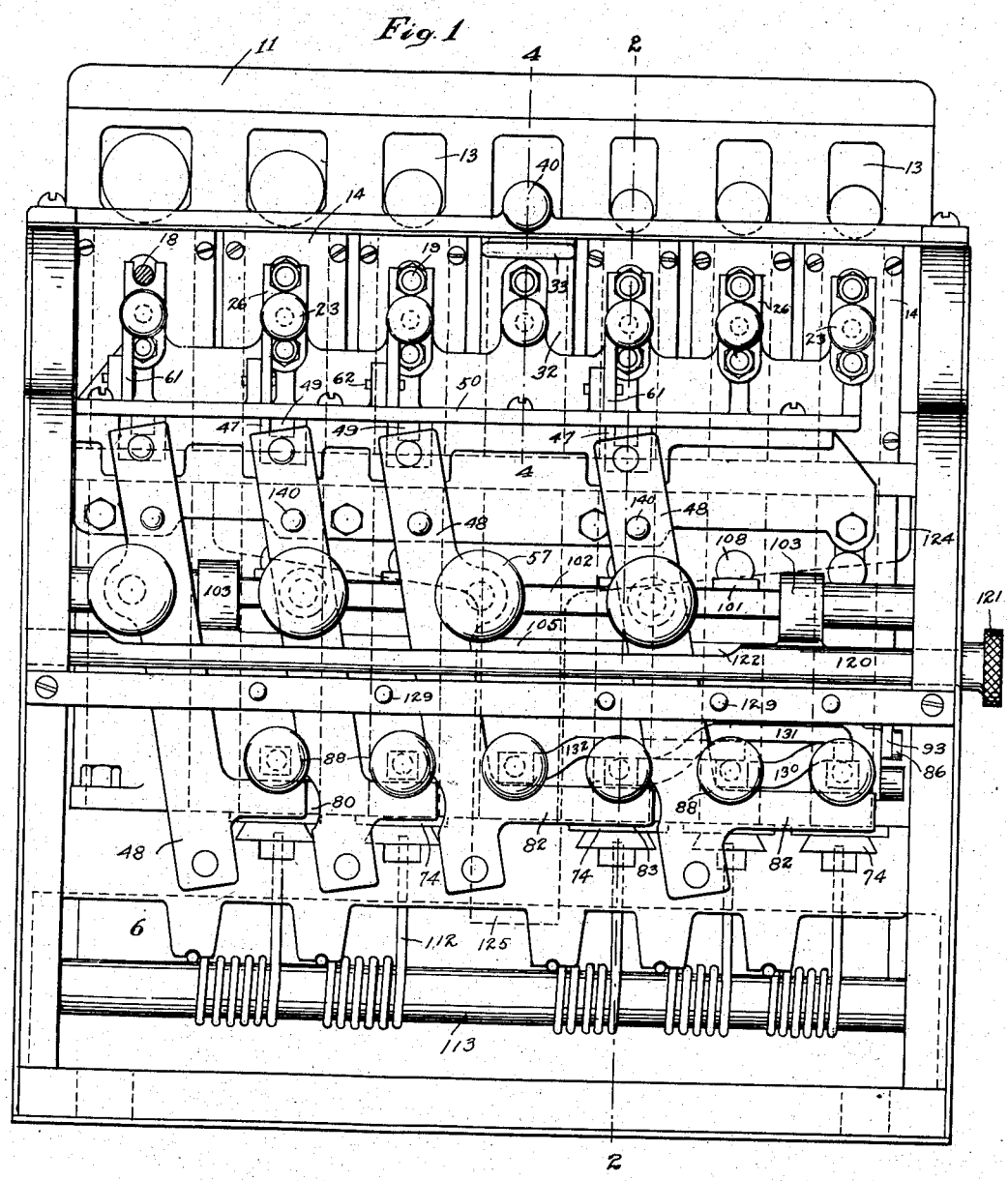

B. R. WHITE.
COIN RECEIVER AND MONEY CHANGER.
APPLICATION FILED MAR. 7, 1910.

1,010,993.

Patented Dec. 5, 1911.

6 SHEETS—SHEET 2.

Witnesses.

Inventor
Byron R. White
by Alfred M. Allen
Attorney

B. R. WHITE.
COIN RECEIVER AND MONEY CHANGER.
APPLICATION FILED MAR. 7, 1910.

1,010,993.

Patented Dec. 5, 1911.

6 SHEETS—SHEET 4.

Witnesses
Frank L. Kunkel
H. Smith

Inventor
Byron R. White
by Alfred M Allen
Attorney

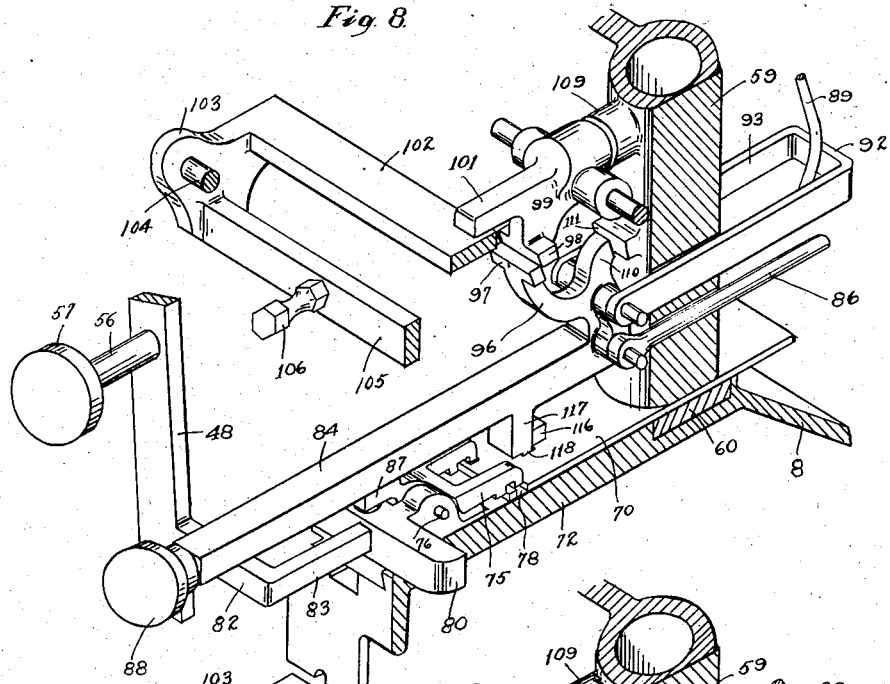
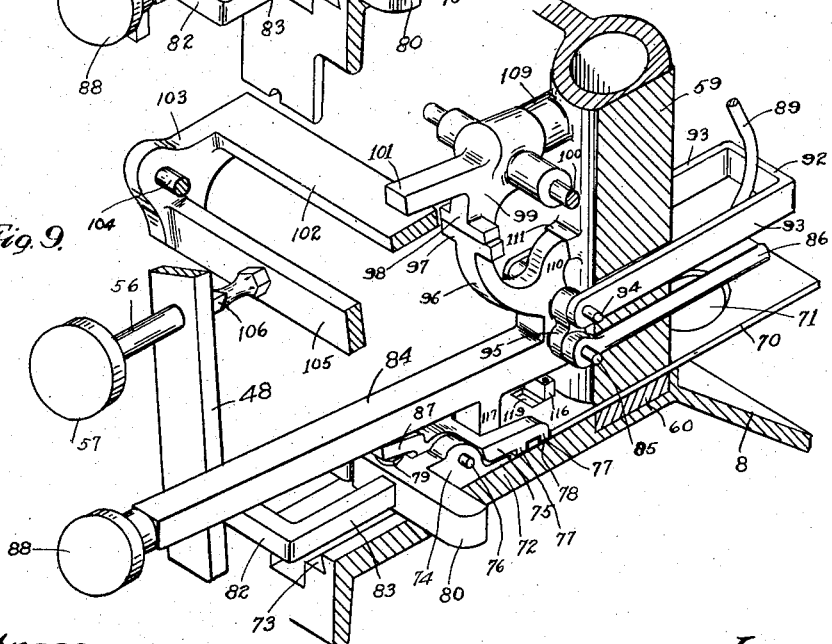

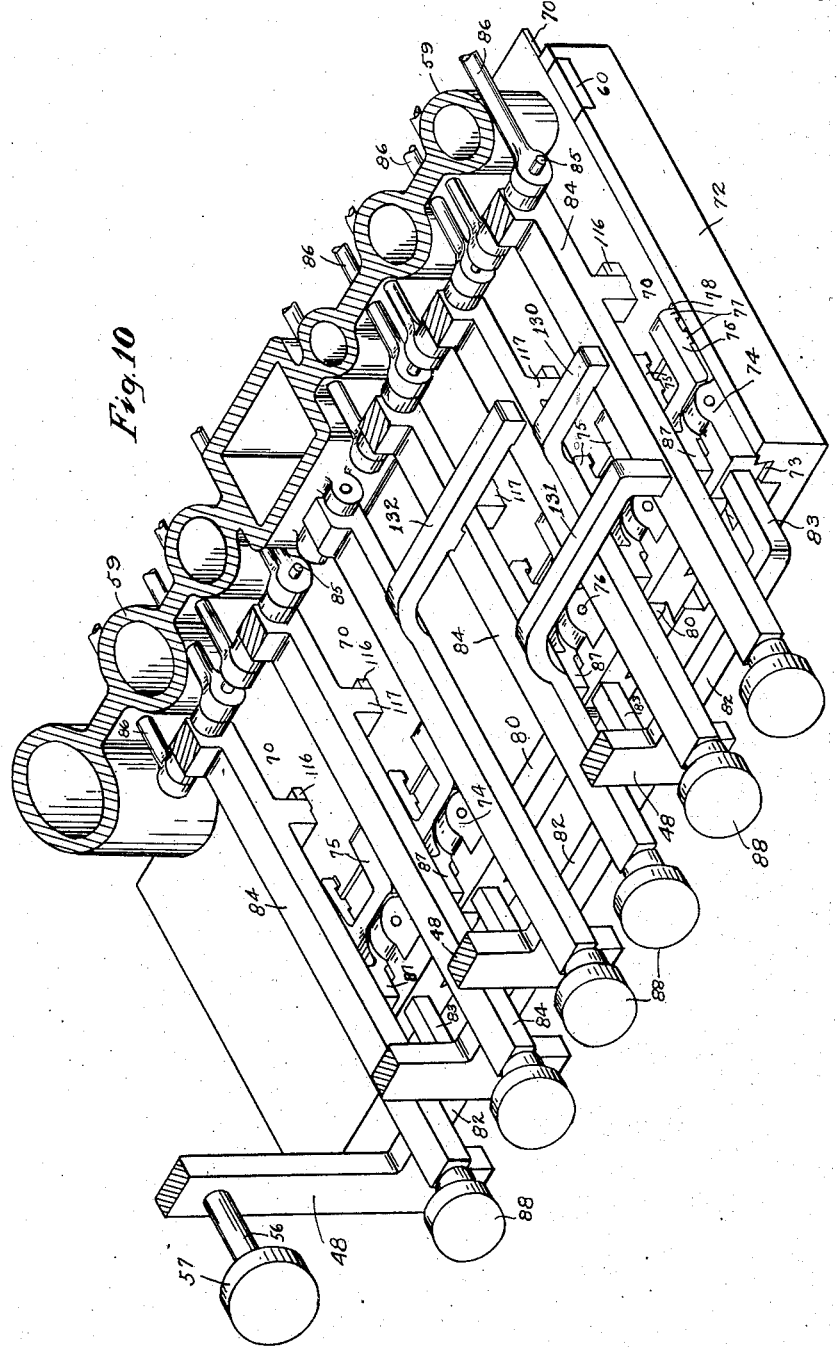

UNITED STATES PATENT OFFICE.

BYRON R. WHITE, OF NORWOOD, OHIO, ASSIGNOR TO DAVID DAVIS, OF CINCINNATI, OHIO.

COIN-RECEIVER AND MONEY-CHANGER.

1,010,993. Specification of Letters Patent. Patented Dec. 5, 1911.

Application filed March 7, 1910. Serial No. 547,793.

*To all whom it may concern:*

Be it known that I, BYRON R. WHITE, a citizen of the United States, and a resident of the city of Norwood, in the county of Hamilton and State of Ohio, have invented certain new and useful Improvements in Coin-Receivers and Money-Changers, of which the following is a full, clear, and exact description, reference being had to the accompanying drawings, forming part of this specification.

The object of my invention is to provide a closed and locked receptacle for the deposit of coins of varying denominations used in the purchase of any desired commodity, and with which the user may deliver from the machine the proper amount of change without handling the coins originally deposited, and my invention is especially designed, in the embodiment thereof shown and described, for use in street cars and the like, for the reception of the cash fare paid and to return to the passenger the proper amount of change, when the denomination of the coin deposited in the machine exceeds the amount of the cash fare or fares required to be paid. For machines designed for this particular purpose, a series of independent slots are arranged side by side in the upper portion of the machine for the reception of the coins of fractional denominations up to and including a dollar, namely: nickels, dimes, quarters, half dollars and dollars. These coins are initially stopped in front of a display glass covered opening to permit the conductor or other party in charge of the machine to reject spurious or counterfeit coins. But when a coin has been inspected and approved and the initial stop is withdrawn, the coin then passes into the machine out of the control of the operator and accessible only to the party in possession of the key to the money drawer or deposit box. The coins as they are deposited, are held in separate tubes or cylindrical receptacles for which means are provided to separate out and deliver the amount of change required. The means provided in connection with machines designed for use in conveyances where five cents is the fare for a single passenger are so constructed and arranged that when change is not required, the amount delivered shall always be five cents less than the amount deposited. In the event that more than a single fare is to be retained from the amount deposited, means are also provided to lock out such change delivery device as may be necessary, so that the proper multiple of fares may be retained, and the proper decreased amount of change delivered.

The novel features of my invention while designed to accomplish the above general purposes also involves many other features of novelty in the construction and operation of the parts which will be hereinafter particularly pointed out and claimed. It will be understood, however, that machines embodying the general and specific features of construction of my invention may be designed as cash receivers and money changers for very many other purposes, and I do not wish to limit myself to the construction of machines especially designed for the collection of fares or the delivery of change in public conveyances.

Figure 2:
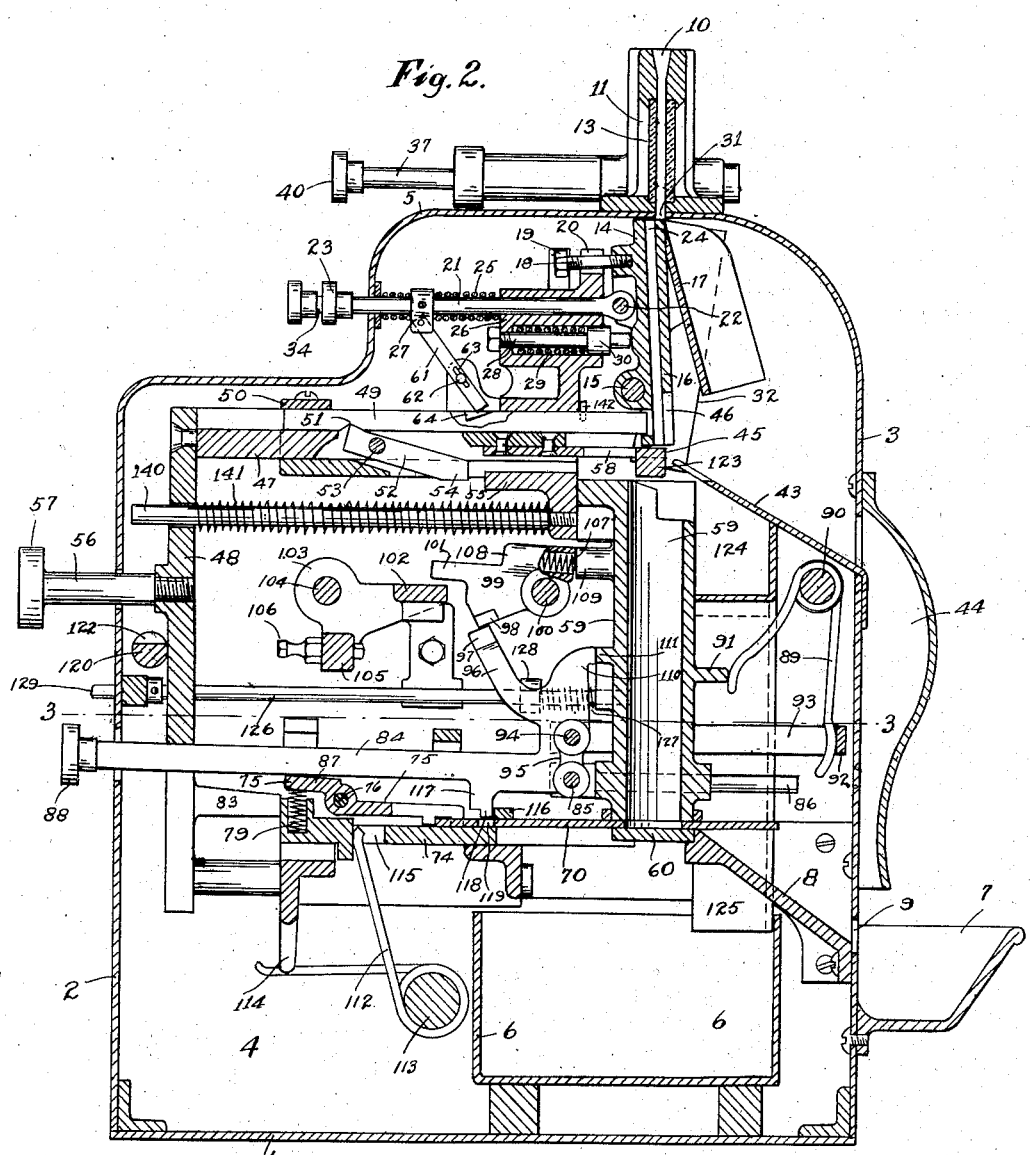
Figure 3:
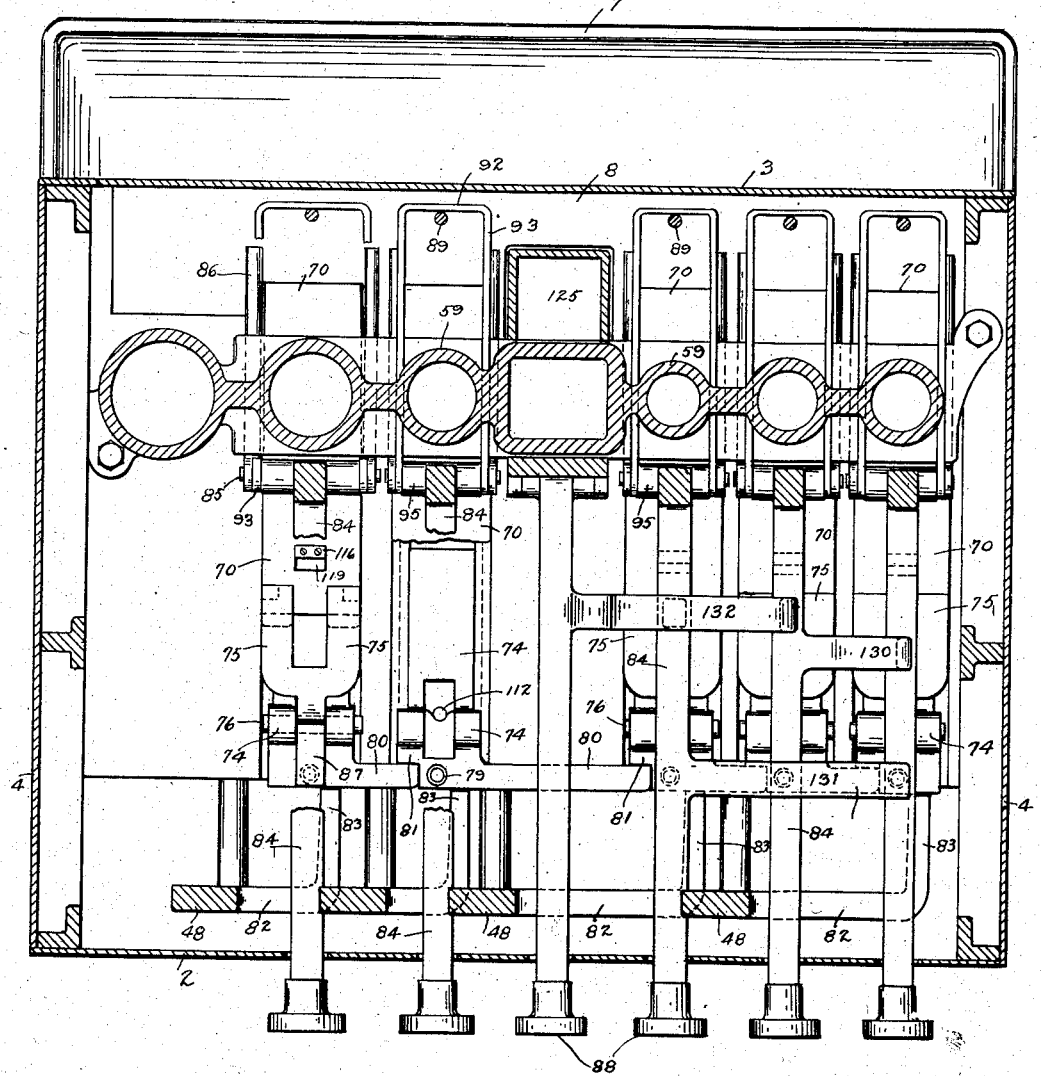
Figure 4:
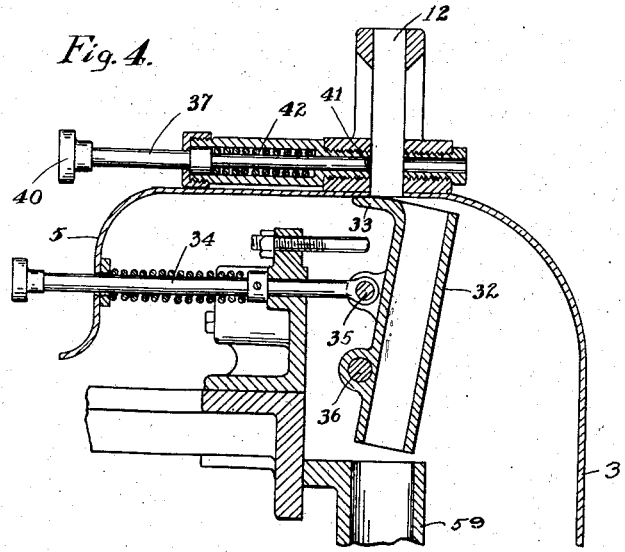
Figure 5:
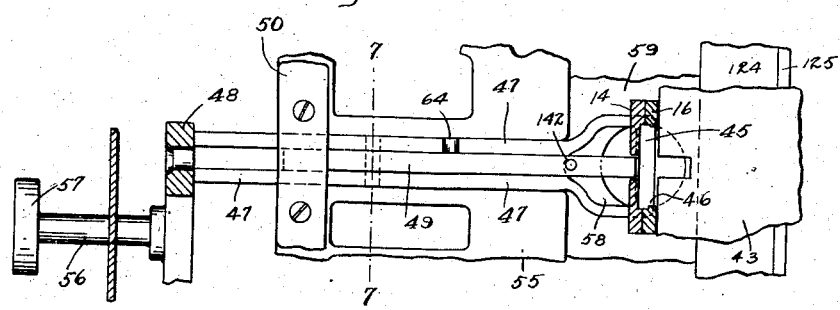
Figure 6:
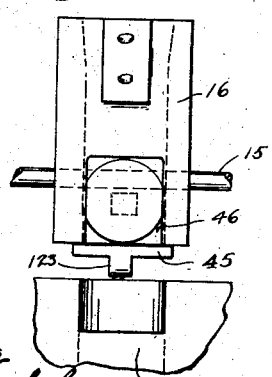
Figure 7:
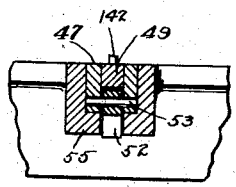

In the drawings,—Figure 1 is a front elevation of my machine with the front wall of the body of the machine removed. Fig. 2 is a vertical cross section taken on the line 2, 2, of Fig. 1. Fig. 3 is a sectional, top plan view taken on the line 3, 3, of Fig. 2. Fig. 4 is a cross section of the upper portion of the ticket receiving chutes and mechanism controlling the same taken on the line 4, 4, of Fig. 1. Fig. 5 is a detail, top, plan elevation of one of the releasing slides taken on the line 5, 5, of Fig. 2. Fig. 6 is a detail rear view of one of the coin chutes with the outer trough removed. Fig. 7 is a cross section taken on the line 7, 7, of Fig. 5. Fig. 8 is a transverse view of a portion of the operating mechanism for making change with the operating levers in one position. Fig. 9 is a similar perspective view with the operating levers in another position. Fig. 10 is a perspective view of the multiple fare controlling mechanism.

The operating mechanism is inclosed in a suitable case composed of bottom 1, front wall 2, rear wall 3, side walls 4, 4, and top casing 5, so that all the working parts and money receptacles shall be inaccessible. In the lower part of the casing is located a money box 6, open at the top for the ultimate reception of the cash deposited in the machine and to which access is had through any suitable locked door. At the rear of the machine is an open trough or elongated cup 7, for the reception of the change delivered by the machine which, in the manner hereinafter described, is deposited on the inclined shelf 8, whence it slides through the openings 9 into the cup.

At the upper portion of the machine and arranged side by side, are a series of slots 10, independent of each other, and running across the machine from side to side, these slots being suitably formed in the upper frame 11, a part of the casing. In the embodiment of the machine illustrated which is intended for use in traction car service, there are six of these slots:—the first two on the right are made of a size to receive five cent pieces, the next of a size to receive ten cent pieces, and the three slots on the left to receive twenty-five cent, fifty cent and dollar coins. There is a middle slot 12, Fig. 4, intended for the deposit of tickets, but this slot and the chute carrying the tickets into the receptacle at the bottom are not connected with the money delivering mechanism of the machine. The front wall of these several slots is cut away at 13 and covered with a glass window, and as will be hereafter described, the coins and tickets are caught at the base of this covered opening so that temporarily they remain exposed through the glass covered opening for the inspection of the operator and to enable him to reject spurious and counterfeit coins or tickets.

Corresponding to the number of money and ticket receiving slots, I provide a series of chutes 14 to carry the coins to the second position of stoppage. These chutes are of the proper size to permit the passage of the proper coins and they are each pivoted on a rod 15 running across the machine and suitably supported in the end walls. Attached to the back wall 16 of each of these chutes is an inclined trough 17. Each chute is provided with a stop pin 18 having a head 19, which abuts against a perforated lug 20 through which the stop pin passes to prevent the chutes from swinging too far to the rear.

Each of the money chutes is controlled by a rod 21 pivoted at 22 to its respective chute and extending through the front wall of the casing and provided with an operating head 23. By pushing on this rod the particular chute may be rocked on the pivot 15 to bring the slot or chute opening 24 in register with its respective coin receiving slot. Normally, the chute is held in the position shown in Fig. 2 by the coiled spring 25, mounted on the rod 21 and bearing between a portion of the frame 26 through which this rod passes and a collar 27 mounted on the rod 21.

28 is a pin, one for each chute, seated in the framework, each pin provided with a coil spring 29, bearing between a collar 30 and the frame, which spring-pressed pin serves as a buffer for the chute when the rod 21 is pulled outwardly. Normally, this chute stands in the position indicated in Fig. 2, with the passageway out of register with the upper slot, and so that the coin deposited in the slot will rest on the top edge 31 of the rear wall of the chute. In this way, the coins are held in front of the glass covered openings 13 to inspect the amount of the coin.

In the same way, as illustrated in Fig. 4, 32 is the chute for the tickets provided with a forwardly extending lip 33 at its upper end, which lip extends across the bottom of the ticket passageway, so as to hold the ticket for inspection.

34 is a rod pivoted at 35 to the chute, by means of which rod the chute may be swung forward on its pivot 36 to allow the ticket to drop through the chute 32.

37 is a punch rod sliding in its socket and provided with an operating head 40 and a punch 41, and by pressing in the rod 37 the punching end 41 will be driven through the ticket. The coiled spring 42 returns this rod to its normal position.

Should the operator, upon inspecting the coins, detect a counterfeit or spurious coin, by pulling out the rod 21 controlling the particular chute for the passageway in which the coin has been deposited, he brings the trough 17 under the opening and the coin drops down onto the inclined shelf 43, whence it drops through the covered opening 44 into the coin receptacle 7. If upon inspection, the coin is found to be good, the operator pushes in the proper rod, 21, which swings the proper chute, bringing the passageways into alinement, and the coin drops down onto the stopping bar 45, where it is again arrested, and where it is now out of the control of the operator, unless too small a coin has been dropped into the chute. In this event, an opening 46, of a size to permit the passage of a smaller coin than the proper one, is provided at the rear of the chute, and in the subsequent operations, as will be described, the small coin is passed through this opening onto the shelf 43 whence it finds its way through the passageway 44 into the open cup 7 and is rejected. These stop bars 45, one of which it will be understood is provided for each of the coin chutes, except for the five cent chutes, are connected by rearwardly extending arms 47, 47, as shown in Fig. 5, with a vertically disposed push plate 48. One of these push plates is provided for the ten cent chute, one for the twenty-five cent chute, one for the fifty cent chute and one for the dollar chute, located from right to left in the order named. The five cent pieces do not need to be arrested by any stop bar, and they can be passed down directly into the machine, because no change is required from the five cents deposited. These push plates control the delivery of the proper amount of change.

In order that the push plates cannot be operated unless the coin has been deposited in the proper chute, I provide as follows: Mounted in between the arms 47, 47, of the stop bars 45, one for each bar, is a rod 49, which is frictionally held in position by a plate 50 bolted to the framework and running across the machine from side to side, and the under surface of this rod 49 is provided with a notch 51, which engages the rear end of a lever 52, pivoted by the pin 53 to the side arms 47, 47, and the forward end 54 of this lever normally abuts up against the cross bar 55 of the framework. The inner ends of these rods 49 lie opposite openings in the front and rear walls of the chute immediately above the bar 45, so that if there is no coin stopped by the bar 45, the particular rod 49 can pass into the chute and the lever 52 abuts against the cross bar of the frame 55 and prevents the further actuation of the push bar.

In the event that a coin of the proper size has been deposited in the chute, as hereinafter described, and the same is stopped by the stop bar 54, then the pushing forward of the push bar 48 will slide the bar 49 rearwardly, and the bar will depress the front end of the lever 52, so that the rear end will clear the cross bar 55, allowing the push bar to be pushed in to the full extent.

Each push bar is controlled by the projecting rod 56, provided with the head 57. The stop bar 45 at the rear is provided with an opening 58, so that when the proper coin is in the slot, the opening 58 at the rear can be brought into register with the passage through the slot, and the coin drops through into the cylindrical receptacle 59. There are as many of these tubular receptacles 59 of the proper diameter for the reception and piling up of the coins of the proper denomination as there are receiving chutes, and these tubular receptacles are securely mounted in the framework and preferably cast in a single piece, as indicated in Figs. 9 and 10. At the base of these coin receptacles, the coins are supported and piled up on the fixed bottom plate 60, which runs entirely across the machine underneath each receptacle.

As the push plates for making change are unlocked by the presence of the coin of the proper denomination held in the chute in front of the releasing bar 49, in order to prevent any one chute or chutes being pushed in by the handles 23, so as to permit the passing of a thin plate or wire into the chute to contact with the releasing bar, I pivotally mount a bar 61 to the collar 27 on the rod 21 and hold it in position by a pin 62 which engages a slot 63 in the bar, so that when the rod 21 is pushed in, the lower end of the bar 61 is engaged in the notch 64 in the arm 47, and so long as the chute is kept in register with the receiving slot it will not be possible to operate the push plate.

The coins for making the proper change are taken out as required from the tubular receptacles 59. The lower end of each coin receptacle 59 is slotted immediately above the bottom plate 60; and a series of slides 70 (Figs. 8 and 9) are provided, one for each coin receptacle, arranged to slide back and forth through these slides. These slides 70 are provided with a circular opening 71, of a size to hold one coin at a time, the openings in the respective slides being, of course, of different diameter to conform to the size of the coin of the respective receptacles, and it will be understood that as the slide is pushed or pulled in either direction, forward or back, one coin at a time will be pushed or drawn out of the receptacle. These slides rest on and are guided on the plate 72, which extends horizontally from one side of the machine to the other and as a part of the framework.

Coupled with each slide at the front of the machine and guided in a dovetailed recess 73 in the frame plate 72, is a pusher 74. These pushers are each connected with their respective slides 70 by a lever 75 which is pivoted at 76 to the pusher, and the rear end of these levers is provided with depending lugs 77, 77, one of which engages the end of the slide and the other engages in a socket 78 (Fig. 10) in the slide. Normally these connecting levers 75 are held in engagement with their respective slides by a coiled spring 79 (Fig. 2), which is seated in a socket in the pusher and bears against the under surface of the forward end of its respective lever 75, so that the forward movement of the pusher will carry with it its respective slide 70 to remove from the proper coin receptacle 59 a single coin and drop it on the inclined shelf 8, whence it slides down through the opening 9 into the open cup 7.

Each pusher is provided with a side arm 80 extending horizontally to the right, as viewed from the front of the machine, and each of these side arms engages behind a shoulder 81 (Fig. 3) on the pusher controlling the slide for the coin receptacle of next lower denomination, so that the inward movement of every pusher carries with it all the pushers on the right.

Each of the four pushing plates 48 is provided with a laterally and horizontally extending arm 82 provided with a forwardly projecting extension 83, which extension lies in contact with the pusher controlling the coin receptacle of next lower denomination. As there are two five-cent receptacles, however, the pushing arm 82, 83, of the ten-cent push bar is extended to contact only with the pusher of the one five-cent receptacle on the extreme right of the machine.

It will be evident from the foregoing description, that if a dollar coin has been deposited in the proper coin receptacle on the extreme left, and the push bar 48 numbered for that receptacle and directly in front thereof is pushed in, that it will actuate the pusher and the coin slide for the fifty cent receptacle, and the fifty cent pusher will in its turn carry with it the twentyfive cent pusher. This pusher will carry with it the ten cent pusher and the ten cent pusher will carry with it one five cent pusher and this five cent pusher will carry with it the other five cent pusher. In this way, ninetyfive cents will be withdrawn from the various receptacles and drop into the open cup at the rear. So if twentyfive cents has been deposited, and the twentyfive cent push bar is operated, ten cents and two nickels will be withdrawn from the machine as the proper change. It may very often happen, however, that the passenger desires to pay more than one fare, and in this event I provide mechanism for disconnecting the necessary pushers from their respective coin slides, so that only the required coin slide will be operated. To accomplish this, I provide a series of multiple change levers 84, each one of which is pivoted at 85 (Figs. 8 and 9) upon the forward end of a pair of rods 86, 86, which are slidingly mounted in the framework of the machine, one of each pair on either side of its respective coin receptacle 59. The levers 75 bear with their forward ends 87, each under its respective multiple change lever 84, and the normal position of these multiple change levers 84 is that shown in Figs. 2 and 9, with their front ends provided with the operating heads 88 extending out through suitable slots in the front wall of the case and with these ends raised. In this position, the coiled springs 79 will each hold its respective connecting lever 75 mounted on the pusher in connection with the coin slide 70. When any one of these multiple change levers, however, is depressed, the lever will contact with the forward end 87 of the connecting lever 75, and raise the lever out of engagement with its respective coin slide. Then when the proper push bar is actuated for change, the proper coin slide or slides will be disconnected and will not be operated.

The multiple change levers are normally held with their outer ends raised by the springs 89, 89, one for each change lever, which springs are mounted on a rod 90 running across the rear end of the framework from side to side and suitably supported in the side walls, and one end of each of these springs bears against the lug 91 projecting from the rear of its respective money receptacle, and the other end bears against the rear end of a yoke 92, the side arms 93, 93, of which are pivoted at 94 to links 95, 95. The lower end of each of these links is pivotally mounted on the pintle 85 by which the change levers are pivoted. The force of these springs, it will be seen, will normally hold the change levers 84 with their forward ends raised. In order that these multiple change levers may be held down during the pushing operation, I provide as follows: Extending upwardly from the rear end of each change lever 84 and integral therewith, is a curved arm 96. This arm is provided with a T-shaped head 97, which normally (as shown in Fig. 9) rests under a similar T-shaped head 98 depending from a stop lever 99, which is pivotally mounted on a rod 100, supported at the ends in the framework, there being one of these stop levers for each multiple change lever. Extending out forwardly from each of these stop levers is an arm 101, which lies in the pathway of the bar 102 of the rock frame 103, which frame is pivotally mounted in a suitable support on the side walls of the machine by the pins 104. This rock frame is also provided with another bar 105, and the bars 102 and 105, it will be understood, extend entirely across the machine from side to side, the bar 105 carrying set screws 106, one for each push bar 48, and extending forwardly so as to be brought in contact with its respective push bar when the push bar is in its inner position.

Each of the stop levers 99 is acted upon by a coiled spring 107, which is seated in a socket 108 in the stop lever and bears against the stud 109 on the coin receptacle.

Now when any multiple change lever 84 is depressed from the position shown in Fig. 9 to the horizontal position shown in Fig. 8, this movement will carry the T-shaped head 97 on the upward extending arm 96 of the lever from underneath the T-shaped head 98 of the stop lever and the spring 107 will throw this stop lever down behind the head 97, as shown in Fig. 8, and this multiple change lever 84 will be held down. Now when the push bar has been pushed in and brought in contact with the set screw 106, this will rock the rocker arm 103 and the bar 102 will come in contact with the arms 101 of any stop levers which are down and this will raise the depending heads 98 out of the pathway of the heads 97, and the springs 98 will again raise the multiple change lever to its normal position. The rear end of the upwardly extending arm 96 is curved rearwardly at 110, and when the multiple change lever is raised this extension comes in contact with the stud 111 which serves as a stop for the multiple change lever.

In order to return the pushers and the heads to normal position, I provide the springs 112, which are mounted on the rod 113 running across the machine, one end of these springs bearing against a depending portion 114 of the frame, and the other end engaging in a socket 115, each in its respective pusher.

Each slide 70 is provided with a block 116 on its upper surface, and each block contacts with the depending lug 117 on its respective multiple change lever, and this contact forms a stop to prevent the springs 112 throwing the pushers and the slides too far forward.

When the coin receptacles are filled, the coins, as many as desired, may be removed from the receptacles to be deposited in the deposit box 6 by pulling out the proper multiple change lever 84, and to permit these multiple change levers to be pulled out, I do not pivot the levers on a fixed portion of the frame, but on the ends of the sliding rods 86. The bottom faces of the lugs 117 are each provided with a lip 118, which lip engages in a socket 119 in the slide, so that the slides can be drawn forward to drop the coins into the box instead of onto the inclined shelf 8.

The arrangement so far described for the multiple change levers will only release one of the coin slides, and I therefore provide a series of these levers for different multiples of the single fare. The first multiple change lever on the right merely disconnects the first nickel coin slide, so that if two fares are to be retained, this lever is depressed. The lever for three fares extends out in front of the inside nickel coin receptacle and is provided with an arm 130 which extends over and engages the top of the lever opposite the first nickel receptacle, as shown in Fig. 10. The lever opposite the ten cent coin receptacle is provided with an arm 131 which bridges over the second multiple change lever and bears upon the first lever. The lever opposite the central ticket receptacle is provided with an arm 132 which extends laterally and bears upon the ten cent lever and the second five cent lever.

The arrangement so far described for the multiple change levers will only release one of the coin slides, and I therefore provide a series of these levers for different multiples of the single fare.

120 is a stop bar which extends across the machine in front of the push bars 48, and is controlled by the milled head 121 from outside the machine. This stop bar normally prevents the push bars from being pulled outwardly. The stop bar is cut away at 122, and when it is desired to pull out the push bars so as to remove all of the stop bars 45 which arrest the coins at the bottom of the chute so as to load the coin receptacles for change before the machine is used, the bar 120 is given a quarter turn which permits the pulling out of the push bars and thus opening up the coin receptacles so that coins can be dropped rapidly to fill the same.

The lower end of the push bar 45 is provided with a tongue 123 (Fig. 2), so that when the coin receptacles are filled, the movement of the push bar will dislodge the coins from the top, so that they can drop down into a chute 124 back of the coin receptacles and be carried down through a central chute 125 into the deposit box 6.

126 is a push rod kept extended by a coiled spring 127 interposed between a collar 128 thereon and the frame, which rod extends through an opening into each coin receptacle. The purpose of this rod is to enable the operator by pushing on the outer end 129 of the rod to determine whether the coin receptacle is sufficiently loaded.

The operation of my machine will be sufficiently clear from the foregoing description.

The machine is placed in proper location in the car and is especially applicable for "pay as you enter cars". The passenger entering desiring to pay a five cent fare, if he has the five cent piece drops the same in the five cent chute, and after inspection at the window, the coin is dropped through the chute, and there being no stop bar in the five cent chute, the coin drops down into the five cent coin receptacle. If the passenger wishes to pay a five cent fare and deposits a quarter in the proper receptacle, the quarter is first stopped in front of the window, then released by pushing in the rod 21 by the handle 23, and the coin drops onto the stop bar 45. The operator pushes the push bar in front of the twentyfive cent space and the rod 49 comes in contact with the coin; the lever 52 is released, the bar 45 can be pushed out of the way and the coin drops into the twentyfive cent coin receptacle. At the same time, the arm 82, 83, on the lower end of the push bar contacts with the pusher for the ten cent receptacle, and this push bar carries with it the two five cent coin slides, and there is delivered into the cup 7 twenty cents, the proper amount of change. Now if the passenger desires to pay, say three fares, out of a quarter, the party in charge before actuating the push bar, depresses the three fare multiple lever, that is the one opposite the inside nickel receptacle. This depression of this lever unlocks both five cent coin slides, so that when the push plate is pushed in, the ten cent push bar and coin slide is the only one that operates, and only ten cents is delivered from the machine.

In order to return the push plates to normal position, a guiding rod 140 is secured to the framework, one for each push bar, which guiding rod extends through an opening in the push bar, and upon this rod is mounted a coiled spring 141 bearing between the frame and the push bar for returning the push bar to normal position.

In order to return the unlocking bars 49 to normal position when they have been pushed back by the actuation of the push bar, I provide a pin 142 for each bar 49, which extends upward and is normally in contact with one of the cross bars of the frame. The contact of this pin with the cross bar holds the bar 49 which has been actuated in its normal position, while the push bar frame is returned by its spring to its normal position.

As the second five cent lever carries the arm 130, the depression of the lever opposite the ticket receptacle will carry with it the other nickel multiple change lever. The other two multiple change levers merely disconnect the twentyfive cent coin slide and the fifty cent coin slide. As the second nickel multiple change lever carries with it the other nickel lever, the depression of this lever will disconnect both nickel slides, and as the twentyfive cent push bar acts upon the ten cent slide alone, three fares will be retained by depressing the second lever. As the ten cent lever carries with it only one nickel lever, the depression of this ten cent lever will disconnect the coin slide for fifteen cents, or three fares, and thus, as in the former case, the depression of the third lever will hold out three fares. As the lever opposite the ticket receptacle carries with it the ten cent lever and the two five cent levers, this lever will disconnect the coin slides for twenty cents, and twentyfive cents will be retained. The next lever will disconnect for five fares, and the last lever on the left will disconnect for ten fares, and therefore, in each case, six and eleven fares will be held out. With these six levers, therefore, by depressing one or more, any number of fares up to and including nineteen may be retained by the machine. For example, the combination of the fifth and the first levers will hold up seven fares; the fifth and second, eight fares: the fifth and third, nine fares and the fifth and fourth, ten fares. The combination of the end levers will hold up twelve fares; the combination of the last lever on the left and the second on the right, thirteen fares, and so on.

What I claim as new, and of my invention and desire to secure by Letters Patent, is:—

1. In a machine of the character specified, a series of coin receptacles of different denominations, shiftable plates for discharging the coins from each receptacle, and a series of chutes to deliver the coins to the receptacles, stop bars for arresting the passage of the coins into their several receptacles, means for releasing said stop bars, with a lock therefor, and means for releasing said lock actuated by the arrested coin, with means for connecting the discharging means of each receptacle with the shiftable plate of each receptacle of next lower denomination.

2. In a machine of the character specified, a series of coin receptacles of different denomination, shiftable plates for discharging the coins from each receptacle, and a series of chutes to deliver the coins to the receptacles, stop bars in the chutes for arresting the passage of the coins into their several receptacles, means for releasing said stop bars, with a lock therefor, and means for releasing said lock actuated by the arrested coin, with means for connecting the shiftable plate of each receptacle with the shiftable plates of receptacles of the lower denomination, and means for disconnecting the shiftable plate of any desired receptacle.

3. In a machine of the character specified, a series of coin receptacles of different denomination, shiftable plates for discharging the coins from each receptacle, and a series of chutes to deliver the coins to the receptacles, a stop bar for each chute for arresting the passage of the coins into the several receptacles, and connection therefor with the shiftable plates, and a locking lever, with connecting devices intermediate the stop bar and the coin arrested thereby whereby the locking lever will be actuated to permit the shifting of the stop bar for releasing the arrested coin, with means for connecting the shiftable plate of each receptacle with the shiftable plate of each receptacle of next lower denomination.

4. In a machine of the character specified, a series of coin receptacles of different denominations, shiftable plates for discharging the coins from each receptacle, and a series of chutes to deliver the coins to the receptacles, a stop bar for each chute for arresting the passage of the coins into the several receptacles, and connection therefor with the shiftable plates, and a locking lever, with connecting devices intermediate the stop bar and the coin arrested thereby whereby the locking lever will be actuated to permit the shifting of the stop bar for releasing the arrested coin, with means for connecting the shiftable plate of each receptacle with the shiftable plate of receptacles of lower denomination and means for disconnecting the shiftable plate of any desired receptacle.

5. In a machine of the character specified, a series of coin receptacles of different denomination, means for discharging the coins from each receptacle, and a series of chutes to deliver the coins to the receptacles, a stop bar for each chute for arresting the passage of the coins into their several receptacles, a locking lever mounted on said stop bar normally in contact with the frame and a rod for releasing said locking lever frictionally secured to the stop bar and arranged to contact with the arrested coin to release the lever, with means for connecting the discharging means of each receptacle with the discharging means of each receptacle of next lower denomination.

6. In a machine of the character specified, a series of coin receptacles of different denomination, means for discharging the coins from each receptacle, and a series of chutes to deliver the coins to the receptacles, a stop bar for each chute for arresting the passage of the coins into their several receptacles, a locking lever mounted on said stop bar normally in contact with the frame and a rod for releasing said locking lever frictionally secured to the stop bar and arranged to contact with the arrested coin to release the lever, with means for connecting the discharging means of each receptacle with the discharging means of receptacles of lower denomination and means for locking out the discharging means of any desired receptacle.

BYRON R. WHITE.

Attest:
MARSTON ALLEN,
K. SMITH.